(12) United States Patent
Gao et al.

(10) Patent No.: US 11,100,194 B2
(45) Date of Patent: Aug. 24, 2021

(54) METHOD AND SYSTEM FOR CARGO SENSING ESTIMATION

(71) Applicant: BlackBerry Limited, Waterloo (CA)

(72) Inventors: Yu Gao, Waterloo (CA); Sandeep Chennakeshu, Austin, TX (US); Jesse William Bennett, Apex, NC (US); Scott Leonard Dill, Paris (CA)

(73) Assignee: BlackBerry Limited, Waterloo (CA)

( * ) Notice: Subject to any disclaimer, the term of this patent is extended or adjusted under 35 U.S.C. 154(b) by 595 days.

(21) Appl. No.: 15/995,939

(22) Filed: Jun. 1, 2018

(65) Prior Publication Data

US 2019/0370311 A1 Dec. 5, 2019

(51) Int. Cl.
| | |
|---|---|
| *G06F 17/17* | (2006.01) |
| *G01F 23/296* | (2006.01) |
| *G06F 17/11* | (2006.01) |
| *G06Q 50/28* | (2012.01) |

(52) U.S. Cl.
CPC ........ *G06F 17/175* (2013.01); *G01F 23/2962* (2013.01); *G06F 17/11* (2013.01); *G06Q 50/28* (2013.01)

(58) Field of Classification Search
CPC ...... G01F 23/2962; G01S 17/08; G01S 17/88; G01S 7/497; G06F 17/11; G06F 17/175; G06Q 10/083; G06Q 10/0833; G06Q 10/087; G06Q 50/28

See application file for complete search history.

(56) References Cited

U.S. PATENT DOCUMENTS

| | | | |
|---|---|---|---|
| 5,610,372 A * | 3/1997 | Phillips | G01G 19/086 177/1 |
| 7,015,824 B2 | 3/2006 | Cleveland et al. | |
| 2013/0342653 A1 | 12/2013 | McCloskey et al. | |
| 2015/0145764 A1 | 5/2015 | Hiromi et al. | |
| 2017/0262717 A1* | 9/2017 | Drazan | H04N 7/181 |
| 2018/0038991 A1 | 2/2018 | Chennakeshu et al. | |
| 2018/0137086 A1 | 5/2018 | Stolpman et al. | |
| 2018/0352198 A1* | 12/2018 | Raasch | G06K 9/00771 |

FOREIGN PATENT DOCUMENTS

WO 2017115247 A1 7/2017

OTHER PUBLICATIONS

He et al., "Depth Errors Analysis and Correction for Time-of-Flight (ToF) Cameras", Sensors 2017, 17, 92 (Year: 2017).*

(Continued)

*Primary Examiner* — Regis J Betsch
(74) *Attorney, Agent, or Firm* — Conley Rose, P.C.; J. Robert Brown, Jr.

(57) ABSTRACT

A method at a computing device, the method including obtaining a cargo load signal measurement; and applying an estimator to the cargo load signal measurement, the estimator being in the form of $\hat{x}=ay+bZ$, where $\hat{x}$ is an estimate of a true signal vector, y is the cargo load signal measurement, Z is a calculated or pre-determined reference vector, and a and b are weighting factors.

24 Claims, 8 Drawing Sheets

(56) References Cited

OTHER PUBLICATIONS

Marvin Lindner, "Calibration and Real-Time Processing of Time-of-Flight Range Data", Department of Electrical Engineering and Computer Science of the University of Siegen, Doctor of Engineering (Dr.-Ing.) approved dissertation, May 2010 (Year: 2010).*

PCT International Search Report & Written Opinion of the International Searching Authority; PCT/US2019/033586; dated Aug. 27, 2019; 10 pages.

Ying He, et al.; "Depth Errors Analysis and Correction for Time-of-Flight (ToF) Cameras"; Sensors; vol. 17, Issue 1; Jan. 5, 2017; 18 pages.

* cited by examiner

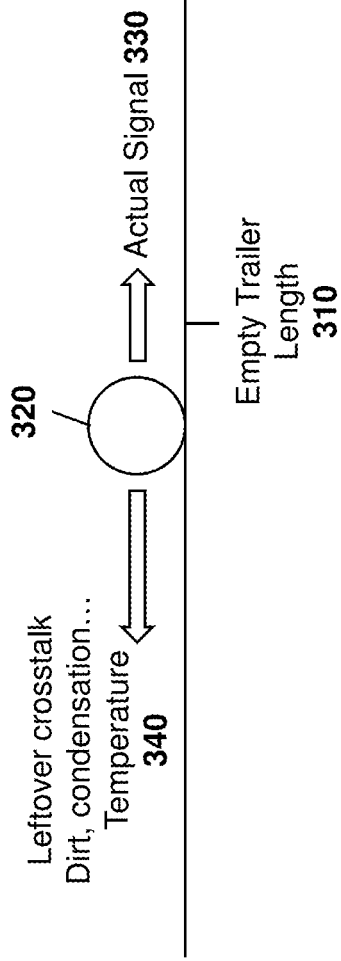
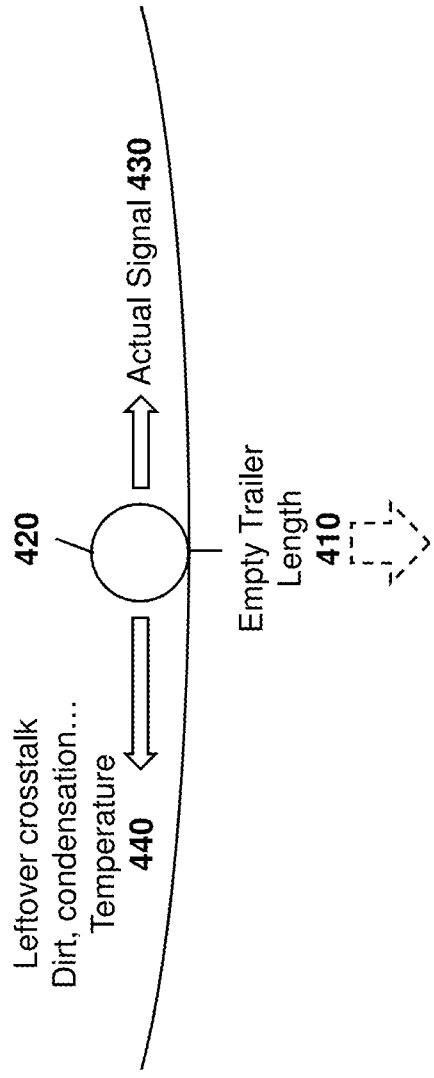

METHOD AND SYSTEM FOR CARGO SENSING ESTIMATION

FIELD OF THE DISCLOSURE

The present disclosure relates to the transportation of goods, and in particular relates to cargo load measurement of containers or trailers for the transportation of goods.

BACKGROUND

During the transportation of goods, it is very valuable to know which trailers or shipping containers are full, and which ones are empty. It is also useful to know, for those containers that are loaded, how full or empty the container is. However, in practice this information is difficult to obtain.

A yard check is one way in which trailer loading is determined. This is a manual process in which a yard worker opens a container or trailer to determine its loading status. However, this method takes up a significant amount of time and human resources.

Automatic load detection may be possible. Trailer cargo detection devices in the market today typically use ultrasonic or light sensors to measure the distance from the load to the measurement device using time of flight (ToF) technology. However, load surface conditions, cross talk, temperature, and dirt or condensation on sensors can create incorrect load status determinations, including false empty or false loaded status determinations.

BRIEF DESCRIPTION OF THE DRAWINGS

The present disclosure will be better understood with reference to the drawings, in which:

FIG. 3 is a block diagram showing a distance measurement in a cargo container as a sphere on a ruler;

FIG. 4 is a block diagram showing a distance measurement in a cargo container as a sphere on a curved surface;

DETAILED DESCRIPTION OF THE DRAWINGS

The present disclosure provides a method at a computing device, the method comprising obtaining a cargo load signal measurement; and applying an estimator to the cargo load signal measurement, the estimator being in the form of $\hat{x}=ay+bZ$, where $\hat{x}$ is an estimate of a true signal vector, y is the cargo load signal measurement, Z is a calculated or pre-determined reference vector, and a and b are weighting factors.

The present disclosure further provides a computing device comprising: a processor; and a communications subsystem, wherein the computing device is configured to: obtain a cargo load signal measurement; and apply an estimator to the cargo load signal measurement, the estimator being in the form of $\hat{x}=ay+bZ$ where $\hat{x}$ is an estimate of a true signal vector, y is the cargo load signal measurement, Z is a calculated or pre-determined reference vector, and a and b are weighting factors.

The present disclosure further provides a computer readable medium for storing instruction code, which, when executed by a processor of a computing device cause the computing device to: obtain a cargo load signal measurement; and apply an estimator to the cargo load signal measurement, the estimator being in the form of $\hat{x}=ay+bZ$ where $\hat{x}$ is an estimate of a true signal vector, y is the cargo load signal measurement, Z is a calculated or pre-determined reference vector, and a and b are weighting factors.

Therefore, in accordance with the embodiments described below, estimators for load detection determination are described. As used herein, an estimator may also be referred to as a compensator for a single measurement.

Distance measurement such as time of flight readings vary quite a bit when measuring empty or minimally loaded trailers over a variety of temperatures and/or under the impacts of dust and/or condensation and/or crosstalk. Of particular importance is the compensation of measurements due to variations of temperature. This is especially true when one compensation formula is applied to all devices for the purposes of calibration.

Figure 1:
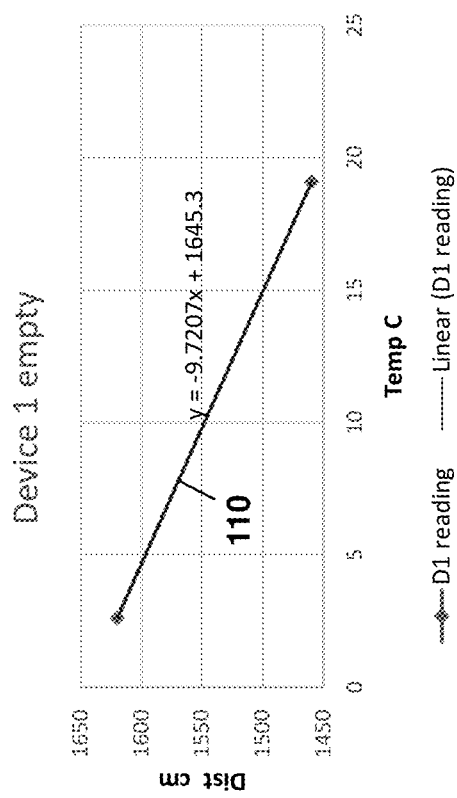
FIG. 1 is a graph showing distance measurement changes with temperature using a first device.

Reference is now made to FIG. 1, which shows a graph depicting differences in distance measurement over a temperature range for a first device. In particular, the first device may be modelled with the formula y=−9.7207X+1645.3, where y is the distance and x is the temperature. The correlation between the distance and temperature thereby show a slope 110.

Figure 2:
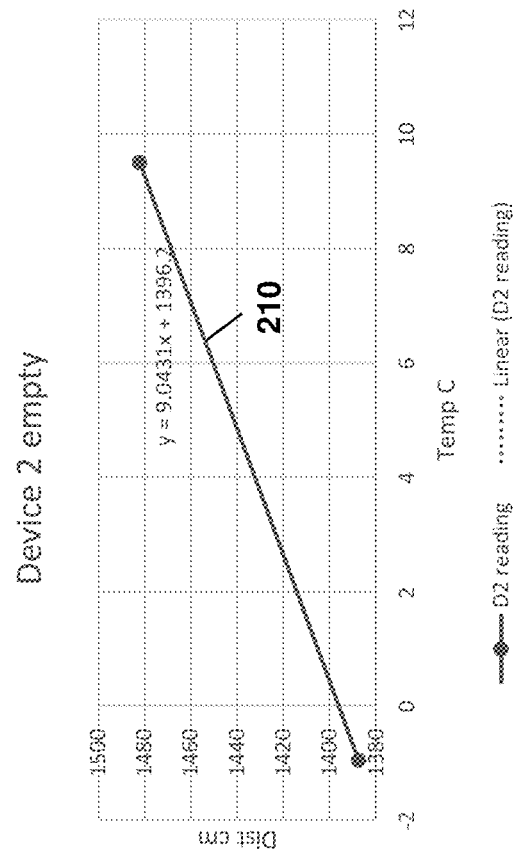
FIG. 2 is a graph showing distance measurement changes with temperature using a second device.

In FIG. 2, a different device has a different temperature and distance correlation, depicted with the formula y=9.0431x+1396.2, and shown with slope 210.

Further, distance measurements may be impacted by calibration between a main board and a sensor module. Specifically, due to process constraints, a ToF sensor module and a main board are typically not calibrated in pairs.

A further factor which may impact distance readings may be dust or condensation, which creates extra crosstalk (transmitted light being reflected into the receiver/detector) on a lens.

Therefore, the difference between a distance measurement versus actual distance is a hardware and process constraint particular to each different hardware product.

The crosstalk between different device calibrations or based on temperature, condensation or dirt, may cause load detection challenges. In a worst-case, leftover crosstalk could cancel out to the actual signal, where the signal magnitudes are similar but the phases are almost 180° different. This may lead to false loaded status detections or false empty status detections, which may be problematic in transportation of goods.

Specifically, current distance measurement systems such as time-of-flight systems are not stable systems when the actual signal is low. In particular, most cargo detection systems act as a ruler to detect the length of the trailer. For example, referring to FIG. 3, an empty trailer length 310 is shown on a linear ruler. The distance measurement is depicted as a ball 320.

The position of ball 320 may be influenced by the actual signal 330. However, the position of the ball 320 may further be influenced by factors 340 including leftover crosstalk, dirt, condensation, temperature, among other similar factors.

As seen from FIG. 3, the use of the linear ruler causes the ball position the 320 to be unstable.

In most cargo measurement systems, the fundamental goal is to reliably report if a trailer is empty or not. Thus, a load detection system needs to be configured rather than a ruler.

Therefore, in accordance with the embodiments described below, a cargo detection system estimator system is provided in which readings from a loading sensor may be stabilized utilizing a reference point. In particular, the estimator may be used to estimate the true signal when noise could affect the cargo measurement significantly.

Reference is now made to FIG. 4. In the embodiment of FIG. 4, empty trailer length 410 is used to create a reference point 412. The proposed reference point may have a distance which may correspond to a trailer length and a magnitude which may be tunable. Such reference point may be integrated into time-of-flight (or other load detection) readings in IQ space.

As seen by the curve, the empty trailer readings will be more stable close to the baseline. Further, such estimator has very small effects on actual load readings, which typically have higher magnitudes.

Thus, distance measurement 420 may be influenced by actual signal 430 and by factors 440, including leftover crosstalk, dirt, condensation, temperature, among other factors. However, the system will stabilize to reference point 412.

The embodiments described below provide detail on such estimator.

Apparatus

In accordance with the embodiments of the present disclosure, a load distance sensing apparatus with communication capabilities may be installed within a trailer or shipping container. Such apparatus may be any general computing device with the capability of capturing load distances. In some embodiments below the load distance sensing apparatus may include a Time of Flight sensor, an ultrasonic sensor, a radio frequency sensor, a laser or array of lasers, or other sensors that can be used to sense a cargo loading state. Further, the load distance sensing apparatus in the embodiments herein may be configured for communicating images or calculation results to a server.

Figure 5:
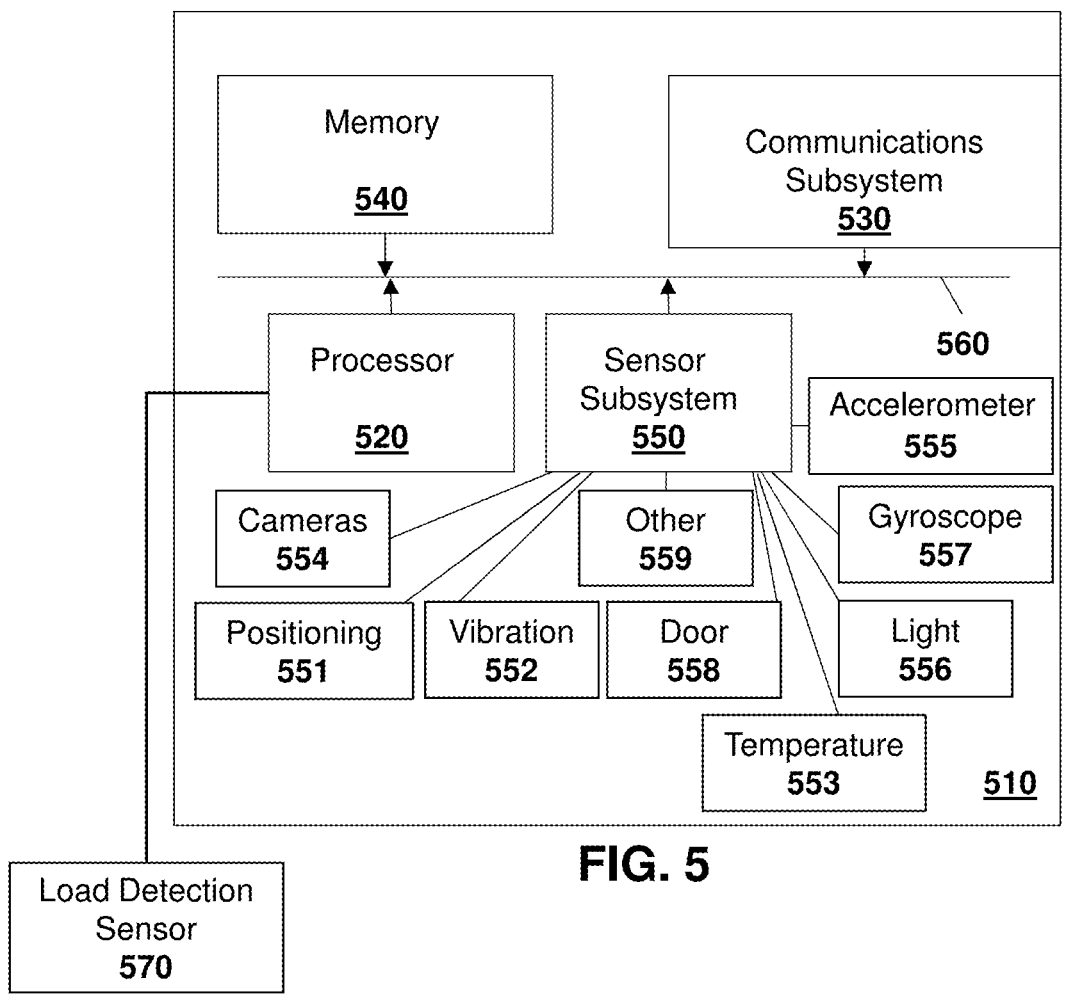
FIG. 5 is block diagram of an example computing device capable of being used between embodiments of the present disclosure.

One computing device for a vehicle or container is shown with regard to FIG. 5. The computing device of FIG. 5 is however merely an example and other computing devices could equally be used in accordance with the embodiments of the present disclosure.

Reference is now made to FIG. 5, which shows an example computing device 510. Computing device 510 can be any device or network node. Such computing device or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Computing device 510 comprises a processor 520 and at least one communications subsystem 530, where the processor 520 and communications subsystem 530 cooperate to perform the methods of the embodiments described herein. Communications subsystem 530 may, in some embodiments, comprise multiple subsystems, for example for different radio technologies.

Communications subsystem 530 allows computing device 510 to communicate with other devices or network elements. Communications subsystem 530 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 530 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 530 will be dependent upon the communication network or communication technology on which the computing device is intended to operate.

Processor 520 generally controls the overall operation of the computing device 510 and is configured to execute programmable logic, which may be stored, along with data, using memory 540. Memory 540 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 540, computing device 510 may access data or programmable logic from an external storage medium (not shown), for example through communications subsystem 530.

In the embodiment of FIG. 5, computing device 510 may utilize a plurality of sensors, which may either be part of computing device 510 in some embodiments or may communicate with computing device 510 in other embodiments. For internal sensors, processor 520 may receive input from a sensor subsystem 550.

Examples of sensors in the embodiment of FIG. 5 include a positioning sensor 551, a vibration sensor 552, a temperature sensor 553, one or more image sensors/cameras 554, accelerometer 555, light sensors 556, gyroscopic sensors 557, a door sensor 558, and other sensors 559. Other sensors may be any sensor that is capable of reading or obtaining data that may be useful for the computing device 510. However, the sensors shown in the embodiment of FIG. 5 are merely examples, and in other embodiments different sensors or a subset of sensors shown in FIG. 5 may be used. For example, in some cases the only sensor may be an load detection sensor.

Communications between the various elements of computing device 510 may be through an internal bus 560 in one embodiment. However, other forms of communication are possible.

In accordance some of the embodiments of the present disclosure, a load detection sensor 570 may be controlled by computing device 510. Load detection sensor 570 may, for example, be mounted together with computing device 510 or may form part of computing device 510. Load detection sensor 570 may be a ToF sensor, an ultrasonic sensor, an RF sensor, or may be an image sensor used to project an array of dots in any light spectrum, including visible light, ultraviolet (UV) light, or infra-red (IR) light, in some embodiments.

Computing device 510 may be affixed to any fixed or portable platform. For example, computing device 510 may be affixed to shipping containers or truck trailers in one embodiment. In other embodiments, computing device 510 may be affixed to any vehicle for which loading status is needed, including self-propelled vehicles (e.g., automobiles, cars, trucks, buses, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, computing device 510 may be part of a container that could be carried on or within a vehicle. In accordance with the present disclosure, the term container may include any sort of cargo or item transportation such as vehicles, intermodal containers, aircraft shipping bins, lock boxes, and other similar vessels.

Such a computing device 510 may be a power limited device. For example, computing device 510 could be a battery operated device that can be affixed to a shipping container or trailer in some embodiments. Other limited power sources could include any limited power supply, such as a small generator or dynamo, a fuel cell, solar power, energy harvesting, among other options.

In other embodiments, computing device 510 may utilize external power, for example from the battery or power system of a tractor pulling the trailer, via a wiring harness connected to a 7 pin plug, from a land power source for example on a plugged in recreational vehicle or from a building power supply, among other options. Thus, the computing device 510 may also be connected to a power cord that receives its power from a power source.

External power may further allow for recharging of batteries to allow the computing device 510 to then operate in a power limited mode again. Recharging methods may also include other power sources, such as, but not limited to, solar, electromagnetic, acoustic or vibration charging.

The computing device from FIG. 5 may be used in a variety of environments. One example environment in which the computing device may be used is shown with regard to FIG. 6.

Figure 6:
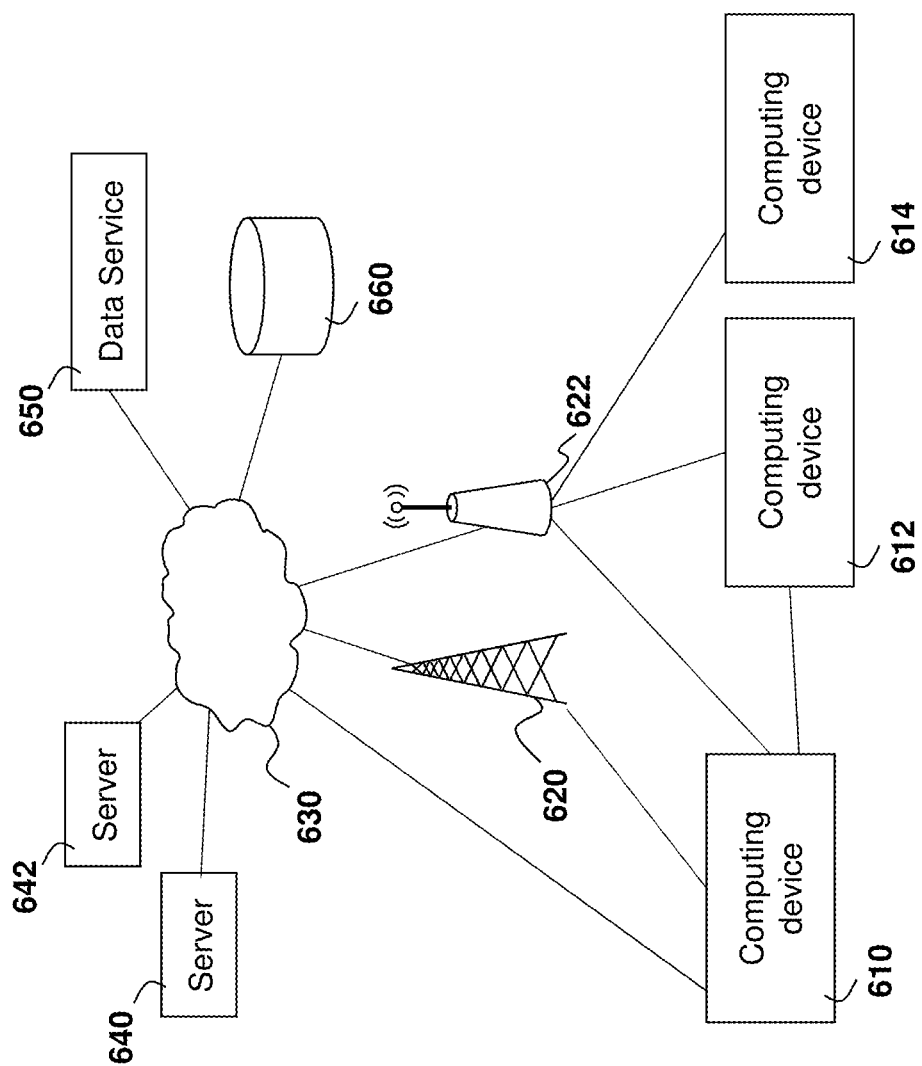
FIG. 6 is a block diagram showing an example architecture for the computing device of FIG. 5.

Referring to FIG. 6, three computing devices, namely computing device 610, computing device 612, and computing device 614 are provided.

In the example of FIG. 6, computing device 610 may communicate through a cellular base station 620 or through an access point 622. Access point 622 may be any wireless communication access point.

Further, in some embodiments, computing device 610 could communicate through a wired access point such as Ethernet or fiber, among other options.

The communication may then proceed over a wide area network such as Internet 630 and proceed to servers 640 or 642.

Similarly, computing device 612 and computing device 614 may communicate with servers 640 or server 642 through one or both of the base station 620 or access point 622, among other options for such communication.

In other embodiments, any one of computing devices 610, 612 or 614 may communicate through satellite communication technology. This, for example, may be useful if the computing device is travelling to areas that are outside of cellular coverage or access point coverage.

In other embodiments, computing device 612 may be out of range of access point 622, and may communicate with computing device 610 to allow computing device 610 to act as a relay for communications.

Communication between computing device 610 and server 640 may be one directional or bidirectional. Thus, in one embodiment computing device 610 may provide information to server 640 but server 640 does not respond. In other cases, server 640 may issue commands to computing device 610 but data may be stored internally on computing device 610 until the sensor apparatus arrives at a particular location, possibly during a particular time window. In other cases, two-way communication may exist between computing device 610 and server 640.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of computing devices 610, 612, 614, etc. For example, the server may be located essentially anywhere so long as it has network access to communicate with computing devices 610, 612, 614, etc.

Server 640 may, for example, be a fleet management centralized monitoring station. In this case, server 640 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading within the trailer, among other data. The server 640 may compile such information and store it for future reference.

Other examples of functionality for server 640 are possible.

In the embodiment of FIG. 6, servers 640 and 642 may further have access to third-party information or information from other servers within the network. For example, a data services provider 650 may provide information to server 640. Similarly, a data repository or database 660 may also provide information to server 640.

For example, data services provider 650 may be a subscription based service used by server 640 to obtain current road and weather conditions, or may be an inventory control system in some cases.

Data repository or database 660 may for example provide information such as image data associated with a particular location, aerial maps, detailed street maps, or other such information.

The types of information provided by data service provider 650 or the data repository or database 660 is not limited to the above examples and the information provided could be any data useful to server 640.

In some embodiments, information from data service provider 650 or the data repository from database 660 can be provided to one or more of computing devices 610, 612, or 614 for processing at those sensor apparatuses.

A computing device such as that described in FIGS. 5 and 6 above may be used to find the loading of a container or trailer.

Cargo Load Measurement

In accordance with one embodiment of the present disclosure, a load detection sensor such as a ToF sensor, ultrasonic sensor, RF sensor, or a combination of a light array and a camera may be used for a load detection system. The present disclosure is therefore not limited to the particular load detection sensor.

Figure 7:
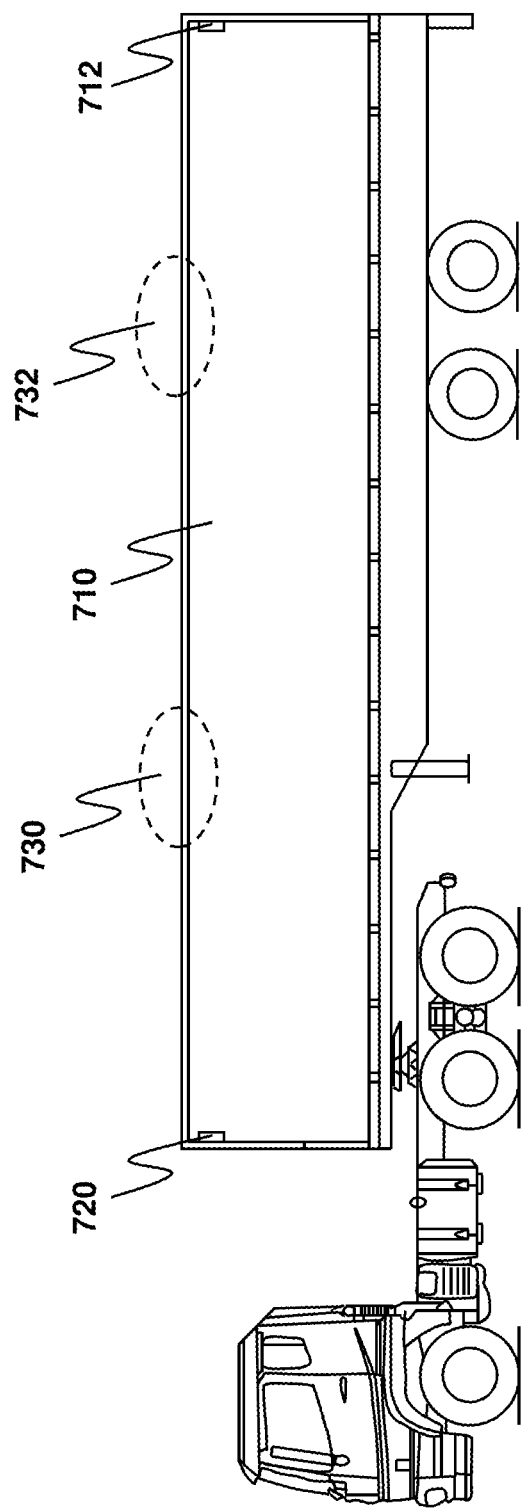
FIG. 7 is a side elevational view of a container showing example placements of the computing device.

A computing device, such as that described above with regard to FIG. 5, may be mounted inside of a trailer or cargo container. Reference is now made to FIG. 7.

In the embodiment of FIG. 7, example truck trailer 710 is shown. In one embodiment, the computing device may be mounted on the back of the trailer. For example, in one embodiment the computing device may be mounted close to the top of the back door or on the rear side wall near the back door of the truck trailer 710. This is shown, for example, with computing device 712 in the embodiment of FIG. 7.

The location of computing device 712 assumes that loading in a trailer is typically done from the front to the back. In this way, a load detection sensor located in such position may detect cargo as it is loaded from the front to the back of the trailer.

However, in other cases it may be beneficial to have a different position for the computing device. Further, in some embodiments it may be useful to have a plurality of such computing devices within the trailer 710.

Thus, for example, in the embodiment of FIG. 7, a computing device may optionally be located at position 720, which is at the front of the trailer. Such computing device located at position 720 may detect loading at the rear of the trailer and may be used alone or in conjunction with a computing device 712.

In other embodiments, one or more computing devices may be located at positions 730 or 732, which is on the ceiling of the trailer. In such case, the load detection would typically be downwards to the deck of the trailer. In some other embodiments, multiple computing devices may be positioned in the lower portion of the back door or front door in order to get a more accurate estimation of the empty space.

Computing devices 712, 720, 730 or 732 may be used alone in some embodiments, or may be combined into sets of two or more computing devices and/or external sensors for load calculation.

Other options for the positioning of a load sensing apparatus are possible.

Typically, cargo load sensing measures the distance from the sensor to the loads, and then calculating a load percentage from the measurement. For example, when a sensor is mounted on the door of the trailer, once the doors are closed, a distance measurement may be taken. The loading percentage may for example be calculated utilizing equation 1 below.

$$\text{Loading \%} = (1 - \text{distance}/\text{trailer length}) * 100 \quad (1)$$

As described above, the distance reading may vary significantly with temperature, or based on the impact of dirty sensors or sensors with condensation, especially when measuring a trailer that is not loaded with or trailers with walls with relative the low reflectivity or trailers with loads that have low reflectivity or small loads all causing a weak signal to be received.

The varied distance reading may lead to false empty or false loaded readings for the cargo load status.

Improvement of Cargo Load Detection

In accordance with one embodiment of the present disclosure, a single cargo loading observation may be taken and a reference point may then be utilized to stabilize the observation. For example, this may be done using equation 2 below.

$$\hat{x} = ay + bZ \quad (2)$$

In equation 2 above, $\hat{x}$ is an estimate of a true signal vector. The variable y is the signal measured, including the true signal and errors. In one embodiment, y could be the mean of a number of cargo loading measurement samples, for example, 20 measurement samples which are measured in a very short duration with the loading condition unchanged. In another embodiment, other data filtering techniques may be utilized to obtain y based on the measurement.

Z is a pre-determined reference vector. In one embodiment, Z is a constant vector, where the phase of the constant vector is dependent on a length of a trailer, and the magnitude of the constant vector is based on one or more empty cargo load signal measurements. In another embodiment, Z is calculated based on the mean of the true signal vector, $\hat{x}$ from the received signal y.

The terms a and b are weighting factors. For example, when a and b are both 1, equation 2 simplifies as:

$$\hat{x} = y + Z \quad (3)$$

Using an estimator, such as that of equation 2 or equation 3, allows for more stable empty cargo readings to minimize errors from the manufacturing process, temperature, environment, among other such factors. In this case, an empty trailer reading will be more stable and closer to the actual trailer length.

Further, using an estimator such as that of FIG. 2 allows a transition between the straight ruler reading embodiment of FIG. 3 to the embodiment of FIG. 4, where a reading will warp down slightly, especially for readings of low magnitude and a high variance when a trailer is empty.

Figure 8:
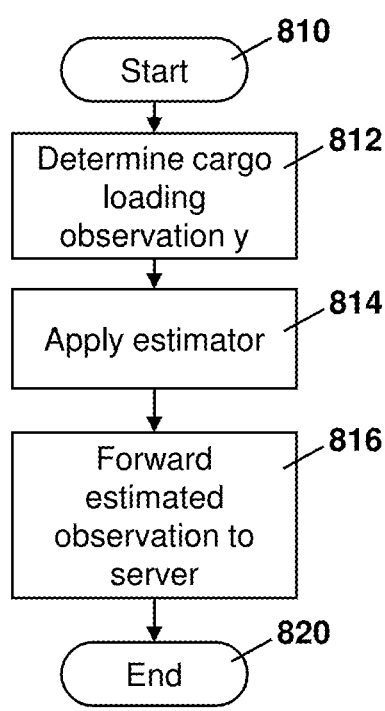
FIG. 8 is a process diagram showing a process for applying an estimator at a computing device associated with a cargo load measurement sensor.

In one embodiment, the estimator may be applied at the computing device on the trailer. Reference is now made to FIG. 8, which shows a process for applying the compensator to readings.

The process of FIG. 8 starts at block 810 and proceeds to block 812, where the computing device takes a cargo loading observation. For example, the cargo loading observation could be the mean of a plurality of cargo loading measurement samples, for example, 20 measurement samples which are measured in a very short duration with the loading condition unchanged. Each cargo loading measurement sample may be one time of flight reading, ultrasonic reading, RF reading, an array of light points, among other options. From equation 2 above, the observation at block 812 may represent the variable y.

The process then proceeds to block 814 in which the estimator is applied to the observation to derive the estimate of the true signal vector. For example, the estimator may use the calculation of $\hat{x}$ from equation 2 or 3 above.

Once the estimator has been applied, the process may then proceed to block 816 in which the computing device may optionally forward the estimated observation to a server. For example, the server may be server 620 or 622 from FIG. 6 above.

Alternatively, rather than proceeding to block 816, the computing device may store the estimator value locally until the computing device is in a position to download the data. For example, this may occur when the trailer arrives at a destination and the computing device establishes a connection with an access point in some cases. Other options are possible.

From block 816 the process proceeds to block 820 and ends.

Figure 9:
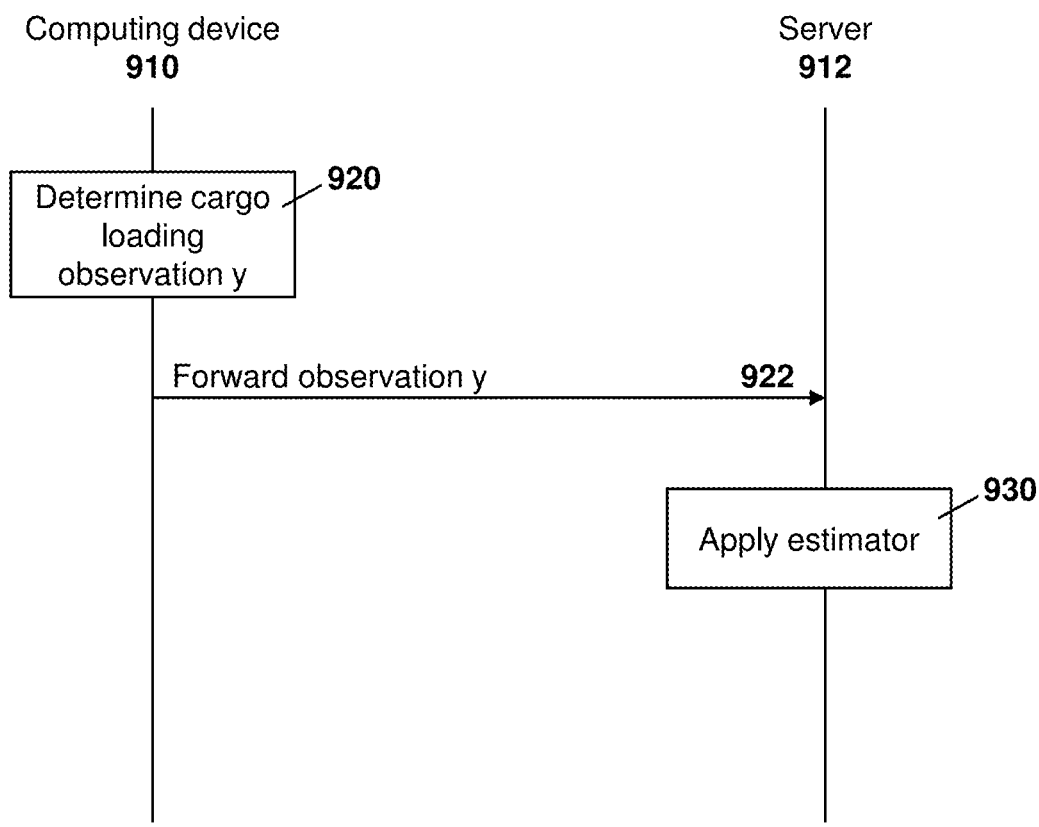
FIG. 9 is a data flow diagram showing a process for applying an estimator at a server based on information received from a computing device.

Alternatively, the compensation may be applied at a server. Reference is now made to FIG. 9.

In the embodiment of FIG. 9, a computing device 910 may communicate with a server 912.

Computing device 910 may be any cargo load detection apparatus and in various embodiments a plurality of computing devices 910 may be communicating with a server 912.

The computing device 910, at block 920, determines a cargo loading observation. For example, this may be based on ToF, ultrasonic sensors, RF sensors, an array of light points, among other options.

Once the observation has been made, the computing device 910 may then forward the observation to the server 912 in message 922.

Server 912, on receiving the observation in message 922, may then apply the estimator to the observation as shown at block 930. Again, the estimator may utilize equation 2 above.

Once the estimator has been applied, the server has the estimate of the true signal vector and may therefore use this estimate to do further processing. For one example, the true signal vector could be used to determine the cargo loading status. For another example, if the trailer is supposed to have cargo but the estimate of the true signal vector indicates that the trailer is empty, this may raise alarms. Other options for acting on the estimate of the true signal vector would be known to those in the art.

In the above equation 2, a and b are designated as weighting factors. These can have any value, and may for example be between zero and one. In some cases, a and b should be greater than zero but less than one. In some cases, the weighting factor may also be a function.

For example, in one embodiment, the weighting factors can be based on a signal to noise ratio (SNR). One example of a formula for the estimate of the true signal vector using SNR is shown with equation 4 below.

$$\hat{x} = \frac{SNR}{SNR+1}y + \frac{1}{SNR+1}z \qquad (4)$$

From equation 4 above, the estimate of the true signal vector uses the signal-to-noise ratio to both weigh both the signal measured as well as the pre-determined reference vector. In particular, in equation 4, if the signal-to-noise ratio is large, i.e., signal is strong, then the signal measured is given more weight. If the signal-to-noise ratio is small, i.e., signal is weak, then the pre-determined reference vector is given more weight.

The signal-to-noise ratio may be calculated in number of ways. In one embodiment, the noise may be set as a constant after a large number of field measurements. For example, in some cases, a value of 0.3 for the noise has been used successfully in experimentation. Other constant values for the noise may however be used.

Further, in some cases, the noise value may be based on the type of sensor or the manufacturer of the sensor being used for the cargo load estimation.

In other cases, the signal-to-noise ratio can be estimated. Other options for finding the signal-to-noise ratio are possible.

Therefore, using equation 4, when the SNR factors considered, the estimator has a very small effect on the actual load readings, which typically have high signals or magnitudes. On the other hand, the formula allows an estimator to stabilize to the reference or baseline when the signal strength is low, which typically occurs when the trailer has no load or has small loads.

In practical situations, the use of equation 4 has been tested with positive results. The results of the tests are, for example, shown in Table 1 below.

TABLE 1

Results with and without Estimator

|  | False Loaded | False Empty |
|---|---|---|
| Without the estimator | 7.18% | 0.96% |
| With the estimator | 0% | 0% |

Based on Table 1 above, without the estimator, there were 7.18% false load events and 0.96% false empty at events. After the estimator has been applied, the false detection rate is down to 0% for both cases.

The testing for the embodiment of Table 1 was validated with 208 historic data readings where the noise level set to 0.3.

Furthermore, utilizing the equation 4 estimator, the estimated empty reading variance is observed to vary at a very low level and the loading percentage is also close to the actual loading state when utilizing such estimator.

Estimation theory provides insight into the proposed estimator. Specifically, using equation 5 below:

$$y = x + n \qquad (5)$$

Where x is the true signal vector which is modelled as a normal distribution with mean=m and variance=$\sigma_x^2$, thereby providing:

$$X = N(m, \sigma_x^2) \qquad (6)$$

Further, in equation 5, n is white gaussian noise, and $$\varphi = N(0, \sigma_n^2) \qquad (7)$$

Equation 7 is the sum total of all noise and distortions, and is therefore a reasonable approximation.

If the estimator is assumed to be linear, then:

$$\hat{x} = \text{an estimate of } x = ay + C \qquad (8)$$

Where a and C are the slope and intercept of the equation.

For the estimator to be minim mean squared error (MMSE) it must satisfy two conditions. Namely:

$$IE[(\hat{x}-x)y^*] = 0 \qquad (9)$$

Which is the orthogonality principle, and:

$$IE[\hat{x}-x] = 0 \qquad (10)$$

Which is the unbiased estimator. In equations 9 and 10 above, IE[•] is a notation of the expected value. Further, the * represents the conjugate since the numbers are complex and not real.

Using the condition of equation 9 and substituting equation 8 results in:

$$IE[(\alpha y + C - x)y^*] = 0 \qquad (11)$$

But using equation 5, y=x+n, results in $$IE[\{\alpha(x+n) + C - x\}(x+n)^*] = 0 \qquad (12)$$

However, we know that $IE[|x^2|] = \sigma_x^2 + m^2$; $IE[x] = m$; $IE[n] = 0$; and $IE[|n|^2] = \sigma_n^2$. Using these, equation 12 can be simplified to:

$$(\alpha-1)\sigma_x^2 + \alpha\sigma_n^2 + (\alpha-1)m^2 + Cm = 0 \qquad (13)$$

Now consider the condition in equation 10. Substituting equation 8 results in:

$$IE[\alpha y+C-x]=0 \tag{14}$$

And substituting equation 5 results in:

$$IE[\alpha(x+n)+C-x]=0 \tag{15}$$

This results in:

$$(\alpha-1)m+C=0 \text{ or } C=(1-\alpha)m \tag{16}$$

Using equation 16 in equation 13 results in:

$$(\alpha-1)\sigma_x^2+\alpha\sigma_n^2+(\alpha-1)m^2+(1-\alpha)m=0 \tag{17}$$

This can be simplified to:

$$\alpha = \frac{\sigma_x^2}{\sigma_x^2 + \sigma_n^2} \tag{18}$$

Using equation 18 into equation 16 results in:

$$C = \frac{\sigma_n^2}{\sigma_x^2 + \sigma_n^2}m \tag{19}$$

Therefore, substituting into equation 8

$$\hat{x} = \frac{\sigma_x^2}{\sigma_x^2 + \sigma_n^2}y + \frac{\sigma_n^2}{\sigma_x^2 + \sigma_n^2}m \tag{20}$$

But, $$\frac{\sigma_x^2}{\sigma_n^2} = SNR \tag{21}$$

Therefore:

$$\hat{x} = \frac{SNR}{SNR+1}y + \frac{1}{SNR+1}m \tag{22}$$

In the equation (22), when a SNR is high (SNR>>1), equation 22 leads to $\hat{x}\rightarrow y$. That means $\hat{x}$ can use y as the estimate. Conversely, if SNR<<1 then $\hat{x}\rightarrow m$, the mean of the signal $\hat{x}$.

For all values between, the $\hat{x}$ is a weighted combination.

For example, when SNR=1, equation 22 is simplified as (ignoring the constant scaling factor ½):

$$\hat{x}=y+m \tag{23}$$

The mean of $\hat{x}$ can be assumed to be the reference vector Z, leading to the equation.

$$\hat{x}=y+Z \tag{24}$$

In the equation 24, y is a cargo loading observation and Z is a pre-determined reference vector.

Further, the use of equation 22 could be used with the embodiments of FIGS. 8 and 9.

A server such as servers 240, 242 or 250 may be any network node. For example, one simplified server that may perform the embodiments described above is provided with regards to FIG. 10.

Figure 10:
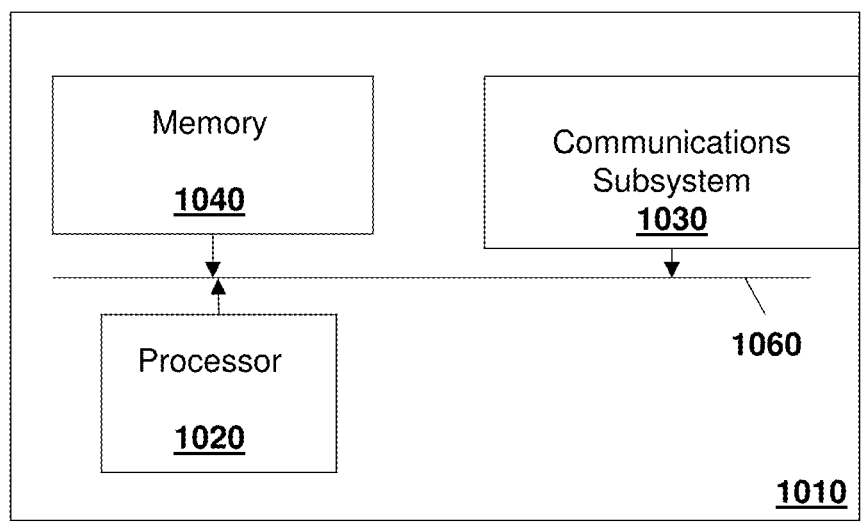
FIG. 10 is a block diagram of an example computing device or server capable of being used with the embodiments of the present disclosure.

In FIG. 10, server 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the server 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the server 1010 may access data or programmable logic from an external storage medium, for example through the communications subsystem 1030.

The communications subsystem 1030 allows the server 1010 to communicate with other devices or network elements.

Communications between the various elements of the server 1710 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device, the method comprising:
   obtaining a cargo load signal measurement, the cargo load signal measurement comprising a measurement from at least one of a time of flight sensor; an ultrasonic sensor; a radio frequency sensor; or a light array associated with the computing device, the cargo load signal measurement comprising a distance measurement;
   applying an estimator to the cargo load signal measurement, the estimator being in the form of
   $$\hat{x} = ay + bZ$$
   where $\hat{x}$ is an estimate of a true signal vector, y is the cargo load signal measurement, Z is a pre-determined reference vector, and a and b are weighting factors; and
   sending the estimate of the true signal vector to a server, wherein the true signal vector allows the server to determine a cargo loading status.

2. The method of claim 1, wherein a provides more weighting as a signal to noise ratio of the cargo load signal measurement increases.

3. The method of claim 1, wherein b provides more weighting when a signal to noise ratio of the cargo load signal measurement decreases.

4. The method of claim 1, wherein $$a = \frac{SNR}{SNR+1}$$

and $$b = \frac{1}{SNR+1}$$

thereby producing an estimator of:

$$\hat{x} = \frac{SNR}{SNR+1} y + \frac{1}{SNR+1} Z$$

where SNR is the signal to noise ratio of the cargo load signal measurement.

5. The method of claim 4, wherein the noise in the signal to noise ratio is set as a pre-determined value.

6. The method of claim 4, wherein the noise in the signal to noise ratio is set based on system characterization testing at the computing device.

7. The method of claim 4, wherein the noise in the signal to noise ratio varies based on a sensor at the computing device used for obtaining the cargo load signal measurement.

8. The method of claim 1, wherein Z is determined based on a mean of the true signal vector, $\hat{x}$.

9. The method of claim 1, wherein Z is set as a constant vector.

10. The method of claim 9, wherein the phase of the constant vector is dependent on a length of a trailer, and the magnitude of the constant vector is based on an empty cargo load signal measurement.

11. The method of claim 1, wherein the computing device is a server, and wherein the obtaining includes receiving a communication from a sensor apparatus containing the cargo load signal measurement.

12. The method of claim 1, wherein the cargo load signal measurement is Kalman filtered.

13. The method of claim 1, wherein the cargo load signal measurement is a mean of a plurality of cargo load signal samples.

14. A computing device comprising:
   a processor; and
   a communications subsystem,
   wherein the computing device is configured to:
      obtain a cargo load signal measurement, the cargo load signal measurement comprising a measurement from at least one of a time of flight sensor; an ultrasonic sensor; a radio frequency sensor; or a light array associated with the computing device, the cargo load signal measurement comprising a distance measurement;

apply an estimator to the cargo load signal measurement, the estimator being in the form of $$\hat{x}=ay+bZ$$

where $\hat{x}$ is an estimate of a true signal vector, y is the cargo load signal measurement, Z is a pre-determined reference vector, and a and b are weighting factors; and send the estimate of the true signal vector to a server, wherein the true signal vector allows the server to determine a cargo loading status.

15. The computing device of claim 14, wherein a provides more weighting as a signal to noise ratio of the cargo load signal measurement increases.

16. The computing device of claim 14, wherein b provides more weighting when a signal to noise ratio of the cargo load signal measurement decreases.

17. The computing device of claim 14, wherein $$a = \frac{SNR}{SNR+1}$$

and $$b = \frac{1}{SNR+1}$$

thereby producing an estimator of:

$$\hat{x} = \frac{SNR}{SNR+1}y + \frac{1}{SNR+1}Z$$

where SNR is the signal to noise ratio of the cargo load signal measurement.

18. The computing device of claim 17, wherein the noise in the signal to noise ratio is set as a pre-determined value.

19. The computing device of claim 17, wherein the noise in the signal to noise ratio is set based on system characterization testing at the computing device.

20. The computing device of claim 17, wherein the noise in the signal to noise ratio varies based on a sensor at the computing device used for obtaining the cargo load signal measurement.

21. The computing device of claim 14, wherein Z is determined based on a mean of the true signal vector, $\hat{x}$.

22. The computing device of claim 14, wherein Z is set as a constant vector.

23. The computing device of claim 22, wherein the phase of the constant vector is dependent on a length of a trailer, and the magnitude of the constant vector is based on an empty cargo load signal measurement.

24. A computer readable medium for storing instruction code, which, when executed by a processor of a computing device cause the computing device to:

obtain a cargo load signal measurement, the cargo load signal measurement comprising a measurement from at least one of a time of flight sensor; an ultrasonic sensor; a radio frequency sensor; or a light array associated with the computing device, the cargo load signal measurement comprising a distance measurement;

apply an estimator to the cargo load signal measurement, the estimator being in the form of $$\hat{x}=ay+bZ$$

where $\hat{x}$ is an estimate of a true signal vector, y is the cargo load signal measurement, Z is a pre-determined reference vector, and a and b are weighting factors; and send the estimate of the true signal vector to a server, wherein the true signal vector allows the server to determine a cargo loading status.

* * * * *